May 15, 1951 R. SLAMA 2,553,387
FILTERING APPARATUS
Filed Oct. 20, 1948 2 Sheets-Sheet 2

INVENTOR.
Richard Slama
BY
Louis Necho
Attorney

Patented May 15, 1951

2,553,387

UNITED STATES PATENT OFFICE 2,553,387

FILTERING APPARATUS

Richard Slama, Philadelphia, Pa.

Application October 20, 1948, Serial No. 55,556

1 Claim. (Cl. 210—202.5)

My invention relates to a filtering apparatus of the type which is used for filtering wort and which is commonly known as a "hop jack."

In the beer brewing industry, it is necessary that the wort be filtered so as to separate the hops from the liquid, prior to the delivery of the liquid to the fermentation vats. Also, the wort which comes from the cooking vats at a relatively high temperature should be cooled to a temperature which will permit fermentation.

It is therefore the object of the invention to provide an improved filtering apparatus whereby the hot wort may be effectively, rapidly and efficiently filtered and whereby the temperature of the wort is, simultaneously, considerably reduced thus effecting a corresponding saving in the cooling process.

A further object is to produce an improved apparatus of the type set forth which is durable and inexpensive and which lends itself to continuous large scale operation.

Figure 1:
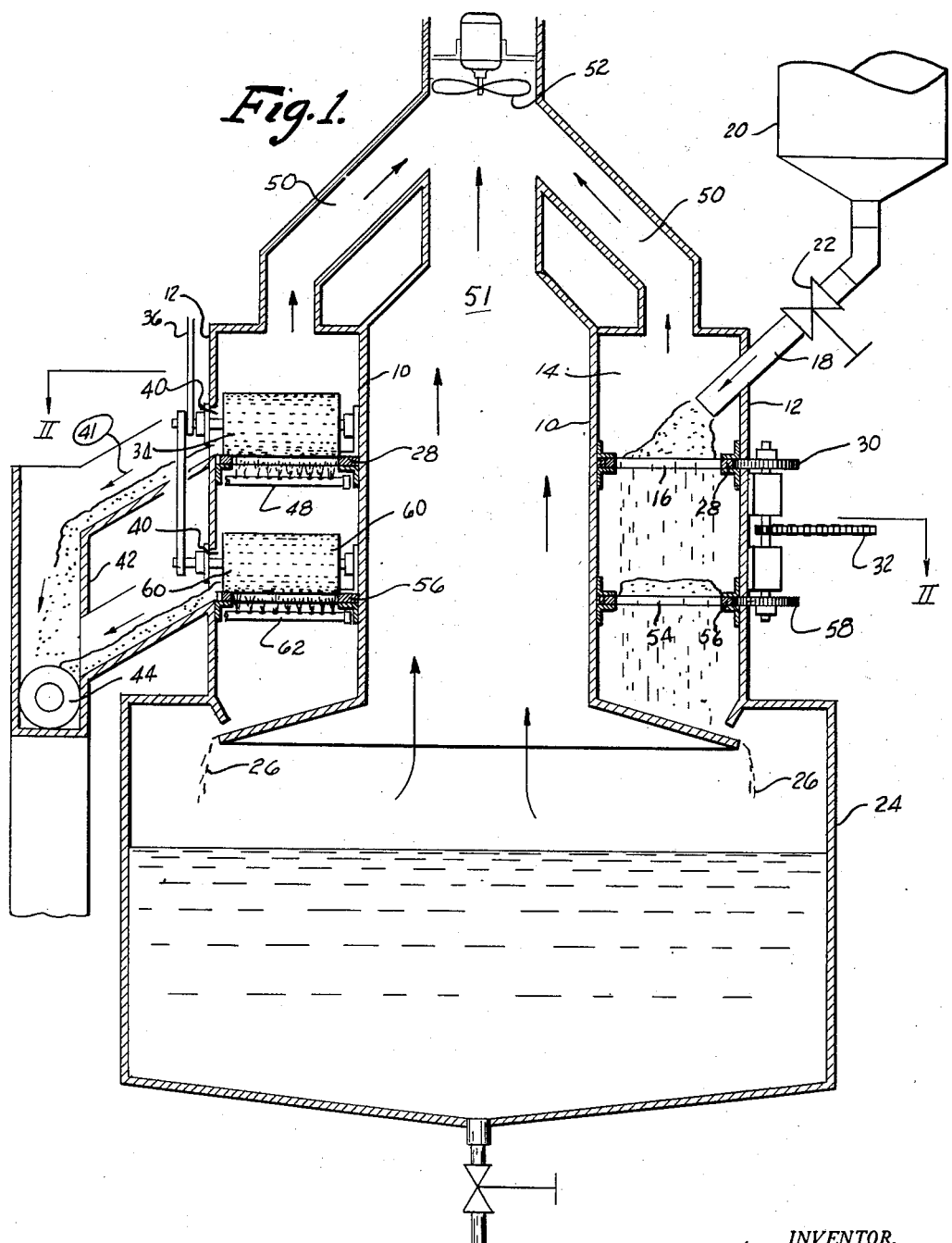

These and other objects are attained by my invention as set forth in the following specification and as shown in the accompanying drawings in which Fig. 1 is a diagrammatic vertical sectional view of a filtering apparatus embodying my invention.

Figure 2:
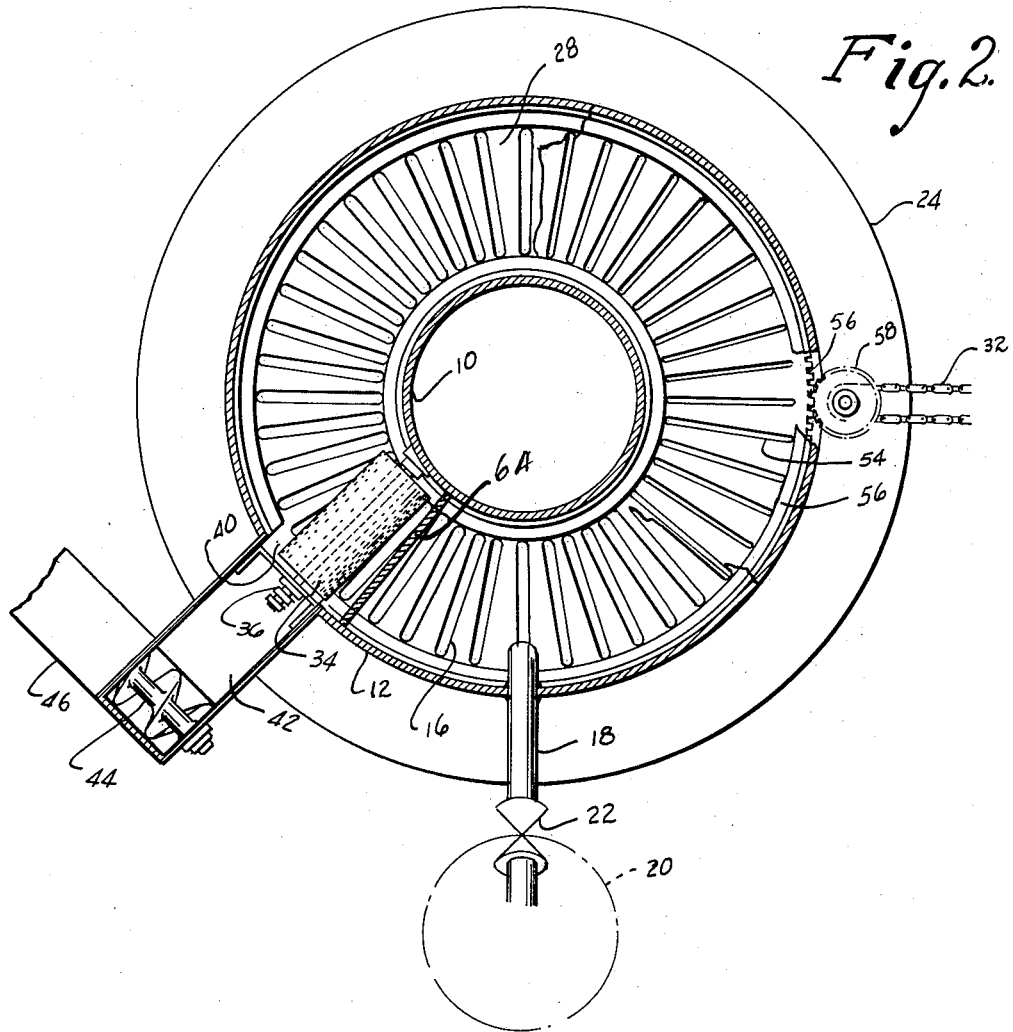

Fig. 2 is a horizontal sectional view looking in the direction of line 2—2 on Fig. 1.

In the embodiment illustrated I provide an inner cylindrical wall 10 and an outer cylindrical wall 12 which cooperate to define an annular chamber 14 the bottom of which is formed by a screen 16. At a suitable point along its circumference, the outer wall 12 is provided with an opening for admitting a conduit 18 leading from the wort cooking vat or from a hopper 20 whereby the hot wort may be discharged, subject to control of a valve 22 onto the screen 16. This screen 16 is fine enough to remove most of the solids but is coarse enough to permit rapid draining of the liquid into a bottom vat 24, as shown at 26.

In order to carry out my invention, the screen 16 is provided with a toothed periphery, or a ring gear 28 which meshes with a pinion 30 driven by a sprocket chain or other means 32. Also, at a point spaced from the point of entry of the pipe 18, I provide a brush 34 which engages the upper surface of the screen 16. The brush 34 is driven by a belt or other source of power 36 so as to scrape the solids accumulating on the surface of the screen. Adjacent the brush 34 there is provided a discharge opening 40 and the brush is slanted toward this opening so that the solids scraped by the brush are discharged, through the opening 40, in the direction of the arrow 41, into a receptacle 42. If desired a screw conveyor 44 may be provided for automatically removing the solids and discharging them onto a conveyor belt 46. At a point out of registration with the brush 34, I provide nozzles 48 for flowing air, under pressure, upwardly through the screen as the latter moves past the brush and towards the pipe 18.

In order to cool the wort, the chamber 14 is provided with a stack 50 from which steam and vapor are withdrawn by means of a fan 52. In order to cool the liquid in the tank 24, I provide a stack or passage 51, formed by the wall 10 and leading to the fan 52.

The operation of the device will be understood from Figs. 1 and 2 from which it will be seen that, as the hot wort is discharged onto the screen, the liquids drain into the tank 24 and the solids form a layer on the screen. When the screen reaches the brush 34, the solids are scraped off and discharged into disposal receptacle 42. After the screen has moved past the brush, it is subjected to a blast of compressed air which serves to dislodge any solids not removed by the brush. By this means, the wort is being constantly discharged onto a clean portion of the screen and therefore the liquids drain through the screen at a very rapid rate. As the screen rotates toward the brush, further drainage takes place and, because, due to constant cleaning, the layer of solids on the screen is never very thick, all the free liquid drains through before the solids are scraped off by the brush. In order to allow maximum time for drainage, the brush 34 is placed relatively close to the pipe 18, as shown in Fig. 2, and not diametrically opposite as shown diagrammatically in Fig. 1.

The fan 52, by drawing off steam and vapor from the chamber 14 and from the tank 24, lowers the temperature of the liquid preparatory to the discharge of the liquid from the tank 24 to the fermentation vat.

While the apparatus thus far described operates satisfactorily, I prefer to provide a second, finer screen 54 which is also provided with a ring gear 56 meshing with a pinion 58 driven from the sprocket 32. The finer screen 54 serves to retain the finer particles of solids which pass through the coarser screen 16 and the solids collecting on the screen 54 are scraped off by a brush 60 identical with the brush 34. If desired, nozzles 62, identical with nozzles 48 may be provided for blowing air upwardly through the screen 54.

A partition 64 is preferably inserted between the inner shell 10 and outer shell 12, with the partition extending from the screen 16 to a point above the discharge end of the pipe 18 so as to prevent the liquid discharged from the pipe 18 to flow in the direction of the brush 34, or to the left as viewed in Fig. 2.

What I claim is:

A filtering apparatus comprising an inner, vertical, annular wall defining an inner chamber, an outer, vertical, annular wall structure coacting with said inner wall to define an outer chamber, a pair of horizontal, vertically spaced, rotary screens located between and coacting with said inner and outer walls to form a lower chamber and an upper chamber, the lower of said screens being of a finer mesh than the upper of said screens, means for rotating said screens, means for delivering the material to be filtered to said screens, there being an opening in said outer wall structure at about the level of each of said screens for discharging solids collected on the screens, a tank below said inner chamber, a stack above said apparatus and communicating with said inner chamber and said tank and with said outer chamber, and an exhaust fan in said tank.

RICHARD SLAMA.

REFERENCES CITED

The following references are of record in the file of this patent:

UNITED STATES PATENTS

| Number | Name | Date |
|---|---|---|
| 359,284 | Plummer | Mar. 15, 1887 |
| 820,560 | Evans | May 15, 1906 |
| 1,150,263 | Godbe | Aug. 17, 1915 |
| 1,264,990 | Stephens | May 7, 1918 |
| 1,335,695 | Oliver | Mar. 30, 1920 |
| 1,882,045 | Stevens | Oct. 11, 1932 |
| 2,073,441 | Blunk | Mar. 9, 1937 |
| 2,390,539 | Katcher | Dec. 11, 1945 |

FOREIGN PATENTS

| Number | Country | Date |
|---|---|---|
| 546,609 | France | Nov. 20, 1922 |